United States Patent [19]
Fuhr et al.

[11] Patent Number: 5,137,953
[45] Date of Patent: Aug. 11, 1992

[54] FLAME-RESISTANT THERMOPLASTIC POLYCARBONATE MOLDING COMPOUNDS

[75] Inventors: Karl Fuhr, Krefeld; Friedemann Müller, Neuss; Karl-Heinz Ott, Leverkusen; Jochen Schoeps, Krefeld; Horst Peters, Leverkusen; Werner Ballas, Dormagen, all of Fed. Rep. of Germany

[73] Assignee: Bayer Aktiengesellschaft, Leverkusen, Fed. Rep. of Germany

[21] Appl. No.: 623,631

[22] Filed: Dec. 4, 1990

[30] Foreign Application Priority Data

Dec. 12, 1989 [DE] Fed. Rep. of Germany ....... 3940927

[51] Int. Cl.$^5$ ............................................... C08K 3/26
[52] U.S. Cl. ................... 524/141; 524/140; 524/142
[58] Field of Search .................. 524/140, 141, 142

[56] References Cited

U.S. PATENT DOCUMENTS

| | | | |
|---|---|---|---|
| 3,697,628 | 10/1972 | Weil | 524/142 |
| 4,172,858 | 10/1979 | Clubley | 524/142 |
| 4,463,130 | 7/1984 | Serini et al. | 525/67 |
| 4,481,338 | 11/1984 | Serini et al. | 525/394 |
| 4,692,488 | 9/1987 | Kress et al. | 524/139 |
| 4,751,260 | 6/1988 | Kress et al. | 524/130 |
| 4,766,165 | 8/1988 | Kress et al. | 524/140 |
| 4,788,238 | 11/1988 | Todtemann et al. | 524/130 |

FOREIGN PATENT DOCUMENTS

| | | |
|---|---|---|
| 1261500 | 8/1985 | Canada . |
| 3429481 | 2/1986 | Fed. Rep. of Germany . |
| 3430234 | 2/1986 | Fed. Rep. of Germany . |
| 3444869 | 6/1986 | Fed. Rep. of Germany . |
| 3523316 | 1/1987 | Fed. Rep. of Germany . |
| 3545609 | 6/1987 | Fed. Rep. of Germany . |
| 3615768 | 11/1987 | Fed. Rep. of Germany . |
| 3628904 | 3/1988 | Fed. Rep. of Germany . |
| 3629546 | 3/1988 | Fed. Rep. of Germany . |
| 3824356 | 1/1990 | Fed. Rep. of Germany . |

*Primary Examiner*—Paul R. Michl
*Assistant Examiner*—Edward Cain
*Attorney, Agent, or Firm*—Joseph C. Gil; Aron Preis

[57] ABSTRACT

The invention relates to thermoplastic molding compounds containing thermoplastic aromatic polycarbonates, thermoplastic copolymers, optionally graft polymers and/or tetrafluoroethylene polymers and/or silicone resins, characterized in that they contain phosphorus compounds corresponding to formula (I)

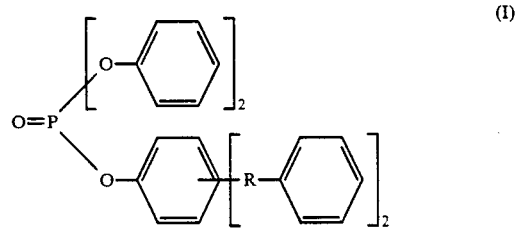

in which
R is a —CH$_2$—,

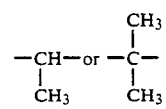

group and the aromatic radicals may even be alkyl-substituted.

1 Claim, No Drawings

FLAME-RESISTANT THERMOPLASTIC POLYCARBONATE MOLDING COMPOUNDS

This invention relates to thermoplastic molding compounds containing

- A) 40 to 90 parts by weight and preferably 50 to 70 parts by weight of a thermoplastic aromatic polycarbonate,
- B) 10 to 50 parts by weight and preferably 15 to 35 parts by weight of a thermoplastic copolymer of 50 to 95% by weight styrene, α-methyl styrene, ring-alkylated styrene, halostyrene or mixtures thereof and 5 to 50% by weight acrylonitrile, methacrylonitrile, alkyl acrylate, alkyl methacrylate, maleic anhydride, N-substituted maleic imide, vinyl acetate or mixtures thereof,
- C) 0 to 25 parts by weight and preferably 0 to 20 parts by weight of a graft polymer produced from
- C.1) 5 to 90 parts by weight and preferably 30 to 80 parts by weight of a mixture of:
- C.1.1) 50 to 95% by weight styrene, α-methyl styrene, halostyrene, ring-alkylated styrene, methyl methacrylate or mixtures thereof and
- C.1.2) 5 to 50% by weight (meth)acrylonitrile, methyl methacrylate, maleic anhydride, N-substituted maleic imide or mixtures thereof, on
- C.2) 10 to 95 parts by weight and preferably 20 to 70 parts by weight of a rubber having a glass temperature TG of $\leq 10°$ C., for example of polybutadiene, alkyl acrylate, EPDM (ethylene-propylene-diene-monomer) or silicone rubbers,
- D) 1 to 25 parts by weight and preferably 2 to 20 parts by weight, based on 100 parts by weight of the total weight of A), B) and optionally C), of a phosphorus compound,
- E) 0 to 5 parts by weight and preferably 0.1 to 1.0 part by weight, based on 100 parts by weight A), B) and optionally C), of a tetrafluoroethylene polymer having average particle sizes of 0.05 to 20 μm and a density of 1.2 to 1.9 g/cm³, or a coagulated mixture of emulsions of the tetrafluoroethylene polymer E) with emulsions of graft polymer C), in which the ratio by weight of graft polymer C) to tetrafluoroethylene polymer E) is from 95:5 to 60:40 and the amount of coprecipitate of C) and E), based on 100 parts by weight A), B) and C), is from 0.1 to 20.0 parts by weight, preferably being used,
- F) 0 to 10 parts by weight and preferably 0.2 to 3.0 parts by weight, based on 100 parts by weight A), B) and optionally C), of a silicone resin having the empirical formula (VII),

(VII)

in which
R is a monofunctional hydrocarbon radical, which may optionally be substituted itself, but is preferably a methyl group and/or phenyl group,
R' is an alkyl group or a hydrogen atom,
x has a value of 0.75 to 1.75 and
y has a value of 0.0001 to 0.5,
and in which the silicone resin is built up of units corresponding to the formula
$SiO_{4/2}$, $RSiO_{3/2}$, $R_2SiO_{2/2}$ and/or $R_3SiO_{1/2}$, a coagulated mixture of emulsions of the silicone resin F) or even an emulsion of a solution thereof, for example in toluene, with emulsions of graft polymer C), in which the ratio by weight of graft polymer C) to silicone resin F) is from 99.9:0.1 to 50:50% by weight and the amount of coprecipitate of C) and F), based on 100 parts by weight A), B) and C) is between 0.1 and 30.0 parts by weight, preferably being used, with the proviso that at least F) or F) are present in amounts of 0.05 parts by weight, based on 100 parts by weight of A), B) and optionally C), characterized in that they contain as the phosphorus compounds D) those corresponding to formula (I)

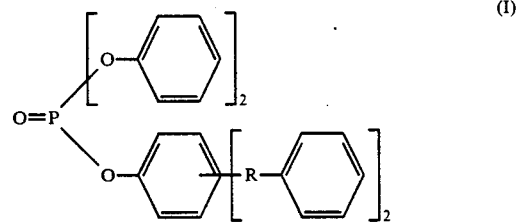

in which
R is a $-CH_2-$,

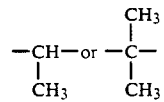

group and the aromatic radicals may even be alkyl-substituted.

Polycarbonate molding compounds containing phosphate esters corresponding to formula (II)

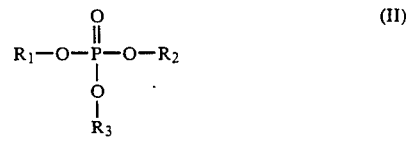

in which
$R_1$, $R_2$ and $R_3$ may be the same or different and represent $C_{1-20}$ hydrocarbon radicals, at least two of the substituents $R_1$, $R_2$ and $R_3$ being substituted or unsubstituted aryl groups, are known (cf. DE-OS 3 429 481 (Le A 23 063) and DE-OS 3 430 234 (Le A 22 925)). However, the compounds corresponding to formula (I) do not occur in these known molding compounds.

Polycarbonate molding compounds containing phosphorus compounds corresponding to formula (III)

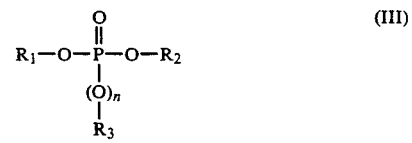

in which
$R_1$, $R_2$ and $R_3$ independently of one another represent an optionally halogenated $C_{1-8}$ alkyl or an optionally halogenated $C_{6-20}$ aryl and "n" is 0 or 1, are also known (cf. EP-OS 0 174 493 (Le A 23 043-EP), DE-OS 3 444 869 (Le A 23 527), DE-OS 3 444 868 (Le A 23 502), DE-OS 3 516 807 (Le A 23 790), DE-OS 3, 521, 388 (Le A 23 877), DE-OS 3 523 316 (Le A 23 927), DE-OS 3 523 314 (Le A 23 940), DE-OS 3 545 609 (Le A 24 039), DE-OS 3 615 768 (Le A 24 500), DE-OS 3 617 511 (Le A 24 501), DE-OS 3 628 904 (Le A 24 683) and DE-OS 3 629 546 (Le A 24 695)). The compounds corresponding to formula (I) are again not mentioned.

The disadvantage of these known molding compounds containing phosphates corresponding to formulae (II) and (III) is mainly that the phosphoric acid esters described in the literature references cited above are partly volatile under production and processing conditions. Increasing the molecular weight of the phosphates by extending the alkyl chains of aromatic compounds generally does not reduce volatility, but instead leads to a reduction in the effectiveness of the phosphates in flame-resistant formulations because the phosphorus content decreases. Accordingly, to re-establish the flame-resistant properties, relatively large quantities of phosphorus additives have to be used; unfortunately, such quantities undesirably reduce the Vicat temperature for example.

It is also known that polycarbonate molding compounds can be flameproofed by polyphosphates [cf. U.S. Pat. No. 4,463,130 (Le A 21 835) and 4,481,338 (Le A 21 841)].

Unfortunately, molding compounds such as these have the disadvantage that, because they contain polymeric phosphates, they do not achieve the high level of flow required.

It has now surprisingly been found that, where phosphoric acid esters of formula (I) according to the invention of, for example, 2,4-dibenzyl phenol, 2,4-di-(1-phenylethyl)-phenol and 2,4-di-(1-methyl-1-phenylethyl)-phenol are used, such properties as impact strength, surface quality and flame resistance remain at a high level while heat resistance (measured as the Vicat B softening temperature) is improved and the tendency of the phosphoric acid esters to evaporate during processing of the molding compounds and migration during storage, particularly at high temperatures, are both suppressed to a considerable extent.

The polycarbonates of component A) suitable for use in accordance with the invention may be both homopolycarbonates and copolycarbonates of diphenols corresponding to formula (IV)

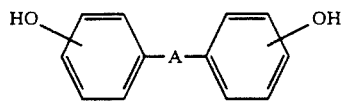

in addition, the polycarbonates of component A) may also be, in particular, copolycarbonates of diphenols (IV) and (IVa)

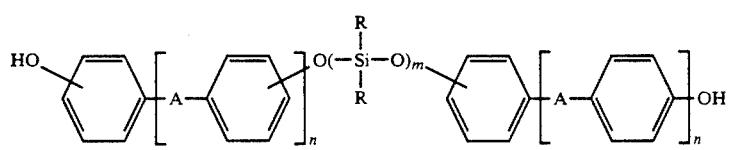

in which
A is a single bond, $C_{1-5}$ alkylene, a $C_{2-5}$ alkylidene, a $C_{5-6}$ cycloalkylidene which can be substituted by methyl groups, —O—, —S— or —SO$_2$—, the aromatic parts may be substituted by methyl groups or halogen atoms,
n is 1 or 0,
the R's may be the same or different and represent a linear $C_{1-20}$ alkyl, branched $C_{3-20}$ alkyl or $C_{6-20}$ aryl, preferably CH$_3$, and
m is a number of 5 to 100 and preferably 20 to 80, the percentage content by weight of diphenols of formula (IVa) in the copolycarbonates being gauged in such a way that the content of diorganosiloxy units (V)

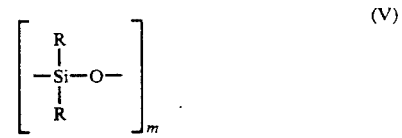

in the polycarbonate (A) is from 1 to 25% by weight and preferably from 2.5 to 25% by weight.

The polycarbonates of component A) may be both linear and branched; they may contain aromatically bound halogen, preferably bromine and/or chlorine, although they may also be free from aromatically bound halogen, i.e. halogen-free.

The polycarbonates of component A) may be used both individually and in admixture. In cases where component A) is a mixture of siloxane-containing polycarbonates and siloxane-free polycarbonates, the siloxane-containing polycarbonates may also have a content of diorganosiloxy units of more than 25% by weight providing the content in the polycarbonate mixture is again between 1 and 25% by weight through mixing with the siloxane-free polycarbonates.

The diphenols corresponding to formula (IV) are either known from the literature or are the subject of German patent applications P 38 32 396.6 (Le A 26 344) or P 38 42 931.4 (Le A 26318) or may be produced by methods known from the literature; hydroxyaryloxy-terminated polydiorganosiloxanes corresponding to formula (IVa) are also known (cf. for example U.S. Pat. No. 3,419,634) or may be produced by methods known from the literature.

The production of the polycarbonates of component A) suitable for use in accordance with the invention is known from the literature or is the subject of German patent applications P 38 32 396.6 (Le A 26 344) and P 38 42 931.4 (Le A 26 318) and may be carried out, for example, with phosgene by the interfacial method or with phosgene by the homogeneous-phase process (so-called pyridine process), the particular molecular weight to be established being obtained in known manner through a corresponding quantity of known chain terminators. The production of polycarbonates containing polydiorganosiloxanes is described, for example, in DE-OS 3 334 782.

Suitable chain terminators are, for example, phenol or p-tert.-butyl phenol and also long-chain alkyl phenols, such as 4-(1,3-tetramethylbutyl)-phenol according to DE-OS 28 42 005 or monoalkyl phenols or dialkyl phenols containing a total of 8 to 20 carbon atoms in the alkyl substituents according to DE-OS 35 06 472, such as for example p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The quantity of chain terminators to be used is generally from 0.5 to 10 mol-%, based on the sum of the particular diphenols (IV) and (IVa) used.

The polycarbonates of component A) suitable for use in accordance with the invention may be branched in known manner, preferably by the incorporation of 0.05 to 2.0 mol-%, based on the sum of the diphenols used, of trifunctional or more than trifunctional compounds, for example those containing 3 or more than 3 phenolic OH groups.

They have average weight average molecular weights ($\overline{M}_w$, as measured for example by ultracentrifugation or scattered light measurement) in the range from 10,000 to 200,000 and preferably in the range from 20,000 to 80,000.

Suitable diphenols corresponding to formula (IV) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane or 1,1-bis-(4-hydroxyphenyl)-3,3,5-trimethyl cyclohexane.

Preferred diphenols corresponding to formula (IV) are 2,2-bis-(4-hydroxyphenyl)-propane and 1,1-bis-(4-hydroxyphenyl)-cyclohexane. Mixtures of diphenols may also be used.

Suitable diphenols corresponding to formula (IVa) are those in which R is methyl, ethyl, propyl, n-butyl, tert.-butyl and phenyl. Mixtures of diphenols corresponding to formula (IVa) may also be used.

Preferred diphenols corresponding to formula (IVa) are those corresponding to formula (IVb)

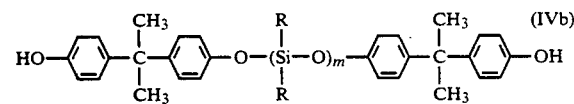

in which
the R's are the same and have the meaning defined above, i.e. represent methyl, etc. and phenyl, and
m is again an integer of 5 to 100 and preferably 20 to 80.

Preferred polydiorganosiloxane-polycarbonate block copolymers are copolycarbonates of the diphenols corresponding to formula (IV) with diphenols corresponding to formula (IVb).

Thermoplastic copolymers of component B) suitable for use in accordance with the invention are resin-like, thermoplastic and rubber-free. Particularly preferred polymers B) are those of styrene, α-methyl styrene, ring-alkylated styrene, halostyrene or mixtures thereof with acrylonitrile, methacrylonitrile, alkyl acrylate, alkyl methacrylate, maleic anhydride, N-substituted maleic imide, vinyl acetate or mixtures thereof. Ring-substituted styrenes are understood to be ring-alkylated styrenes, such as p-methyl styrene for example.

Particularly preferred ratios by weight in the thermoplastic polymer B) are, for example, 60 to 80% by weight styrene, α-methyl styrene, ring-substituted styrene, halostyrene or mixtures thereof and 20 to 40% by weight acrylonitrile.

The polymers of component B) are known and may be produced by radical polymerization and, in particular, by emulsion, suspension, solution or bulk polymerization. The polymers of component B) preferably have molecular weights $M_w$ (weight average, as determined by light scattering or sedimentation) in the range from 15,000 to 200,000.

Rubbers suitable for the production of the graft polymers of component C) are, in particular, polybutadienes, polychloroprenes, polyisoprenes, styrene-butadiene copolymer rubbers, acrylonitrile-butadiene copolymer rubbers having gel contents (as measured at 20° C.) of greater than 30% by weight, acrylate rubbers, EPDM (ethylene-propylene-diene-monomer) rubbers and silicone rubbers. Suitable butadiene-styrene copolymer rubbers may contain up to 30% by weight, based on the weight of the rubber, of a lower alkyl ester of acrylic or methacrylic acid (for example methyl methacrylate, ethyl acrylate, methyl acrylate).

Suitable alkyl acrylate rubbers are those based on $C_{1-8}$ alkyl acrylates, more especially ethyl, butyl, ethylhexyl acrylate. These alkyl acrylate rubbers may optionally contain up to 30% by weight, based on the weight of the rubber, of such monomers as vinyl acetate, acrylonitrile, styrene, ring-alkylated styrene, halostyrene, methyl methacrylate and/or vinyl ether in copolymerized form. These alkyl acrylate rubbers may also contain relatively small quantities, preferably up to 5% by weight, based on the weight of the rubber, of crosslinking ethylenically unsaturated monomers. Crosslinking agents such as these are, for example, alkylene diol di(meth)acrylates, polyether di(meth)acrylates, divinyl benzene, trivinyl benzene, triallyl cyanurate, allyl (meth)acrylate, butadiene or isoprene. Alkyl acrylates such as these are known. Acrylate rubbers as the graft base may also be products which contain a crosslinked diene rubber of one or more conjugated dienes, such as polybutadiene, or a copolymer of a conjugated diene with an ethylencally unsaturated monomer, such as styrene and/or acrylonitrile, as core.

The silicone rubbers suitable for use in accordance with the invention contain dispersed, at least partly crosslinked particulate silicone rubbers essentially containing chemically incorporated groups corresponding to the following general formulae:
a) $R_2SiO_{2/2}$, $RSiO_{3/2}$, $R_2R^3SiO_{\frac{1}{2}}$, $SiO_{4/2}$ and, optionally, groups corresponding to the following formula
b) $R^1CH=CH-(R^2)-$, optionally in combination with SH groups, where
R is a monofunctional, saturated hydrocarbon radical, more especially $-CH_3$, $-C_6H_5$, optionally substituted by $-SH$, halogen, $C_{1-6}$ alkoxyl,
$R^1$ is H, $C_{1-6}$ alkyl, more especially H, $CH_3$,
$R^2$ is a single bond, $C_{1-4}$ alkylene, more especially $-CH_2-$, $-C_2H_4-$ and
$R^3$ is R or OH.

The quantities of the individual siloxane units are gauged in such a way that 0 to 0.5 mol units $R_2R^3SiO_{\frac{1}{2}}$, 0 to 10 mol units $RSiO_{3/2}$ and 0 to 3 mol units $SiO_{4/2}$ are present per 100 mol units $R_2SiO_{2/2}$. In preferred silicone rubbers, at least 80% of all the substituents R are $CH_3$ groups.

In addition, in the case of the group $R_2R^3SiO_{\frac{1}{2}}$, one of the substituents R may be a hydroxyl group. The particularly preferred terminal group is the dimethylhydroxysiloxy unit.

The silicone rubbers contain the groups b) in quantities of 2 to 10 mol-%, based on all the substituents R.

Preferred rubbers for the production of the graft polymers C) are diene-, alkyl acrylate- and silicone rubbers.

The rubbers are present in the graft polymers C) in the form of at least partly crosslinked particles having an average particle size of 0.1 to 3.0 μm and more especially 0.2 to 0.6 μm. They are at least partly crosslinked, i.e. they have gel contents of greater than 20% by weight, preferably greater than 50% by weight and, more preferably, in the range from 73 to 98% by weight.

The graft polymers C) are produced by radical graft copolymerization of the monomer mixtures of C.1.1) and C.1.2) defined at the begining in the presence of the rubbers C.2) to be grafted and are all known. Preferred production processes for the graft polymers C) are emulsion, solution, bulk or suspension polymerization. Particularly preferred graft polymers C) are the so-called ABS polymers.

The phosphorus compounds of component D) suitable for use in accordance with the invention may generally be produced by known methods (cf. for example Ullmann, Enzyklöpadie der technischen Chemie, Vol. 18, pages 301 et seq., 1979; Houben-Weyl, Methoden der organischen Chemie, Vol. 12/1, page 43; Beilstein, Vol. 6, page 177).

The aromatic parts of the phosphorus compounds according to the invention may be alkyl-substituted, the carbon chain containing up to about 4 carbon atoms.

Phosphorus compounds of component D), formula (I), suitable for the purposes of the invention are, for example, phosphoric acid 2,4-dibenzylphenyl-bis-phenyl ester, phosphoric acid 2,4-di-(1-phenylethyl)-phenyl-bis-phenyl ester and phosphoric acid 2,4-di-(1-methyl-1-phenylethyl)-phenyl-bis-phenyl ester. Phosphoric acid 2,4-di-(1-phenylethyl)-phenyl-bis-phenyl ester is particularly preferred.

The phosphoric acid esters of formula (I) according to the invention are also used in admixture with one another and in admixture with phosphoric acid esters corresponding to general formula (VI)

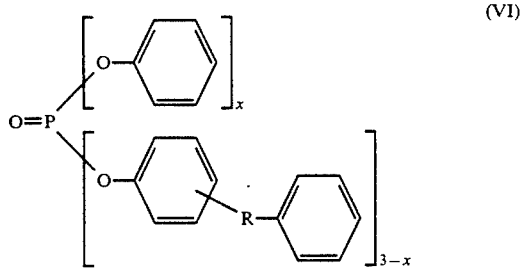

(VI)

in which
R is a direct bond,

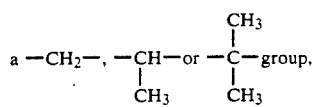

x is 0,1 or 2 and the aromatic radicals may also be alkylsubstituted (cf. German patent application P 38 24 356.3 (Le A 26 015)).

From that patent application, phosphoric acid phenyl-bis-((1-phenylethyl)-phenyl)-ester is particularly preferred for production reasons as a component for mixtures.

Another suitable component for mixtures is phosphoric acid-(2,4,6-tri-(1-phenylethyl)-phenyl)-bis-phenyl ester.

The phosphoric acid esters corresponding to general formula (I) according to the invention may also be used in admixture with polyphosphoric acid esters of novolaks (U.S. Pat. No. 4,105,825). These mixtures may also contain the phosphoric acid esters according to the invention of German patent application P 38 24 356.3 (Le A 26 015) and phosphoric acid-(2,4,6-tri-(1-phenylethyl)-phenyl)-bis-phenyl ester.

Accordingly, the present invention also relates to the molding compounds according to the invention which are characterized in that, in addition to the phosphorus compounds of general formula (I), they also contain the phosphorus compounds corresponding to formula (VI) and/or phosphoric acid (2,4,6-tri-(1-phenylethyl)-phenyl)-bis-phenyl ester and/or polyphosphoric acid esters of novolaks.

The quantity of these other phosphoric acid esters than those corresponding to formula (I) may make up from 0 to 90% by weight of the particular phosphoric acid ester compound in the case of the phosphoric acid esters according to P 38 24 356.3, from 0 to 65% by weight in the case of the phosphoric acid (2,4,6-tri-(1-phenylethyl)-phenyl)-bis-phenyl ester and from 0 to 80% by weight in the case of the phosphoric acid esters of novolaks.

The tetrafluoroethylene polymers of component E) suitable for the purposes of the invention are polymers having fluorine contents of 65 to 76% by weight and preferably 70 to 76% by weight. Examples are inter alia polytetrafluoroethylene, tetrafluoroethylene-hexafluoropropylene copolymers or tetrafluoroethylene copolymers containing small quantities of fluorine-free copolymerizable, ethylenically unsaturated monomers. Polymers such as these are known and may be produced by known methods, for example by polymerization of tetrafluoroethylene in aqueous medium with a catalyst forming free radicals, for example sodium, potassium- or ammonium peroxydisulfate, under pressures of 7 to 71 kg/cm² and at temperatures of 0° to 200° C. and preferably at temperatures of 20° to 100° C. (for further details, see for example U.S. Pat. No. 2,393,967).

The silicone resins F) suitable for the purposes of the invention correspond to the following empirical formula

(VII)

in which
R is a monofunctional hydrocarbon radical, which may even be substituted itself, but more particularly a methyl group and/or phenyl group,
R' is an alkyl group or a hydrogen atom,
x has a value of 0.75 to 1.75 and
y has a value of 0.0001 to 0.5
and in which the silicone resin is made up of units corresponding to the formula $SiO_{4/2}$, $RSiO_{3/2}$, $R_2SiO_{2/2}$ and/or $R_3SiO_{\frac{1}{2}}$.

Preferred silicone resins F) corresponding to formula (VII) are those in which at least 80% by weight of all the substituents R are methyl and phenyl groups. Further details of the silicone resins F) can be found in DE-OS 38 15 124 (Le A 25 925).

The addition of tetrafluoroethylene polymers or silicone resins above all reduces or completely prevents dripping of the molten molding compound in the event of fire.

If the molding compounds according to the invention are produced, for example, by melt compounding in kneaders or extruders from components A), B), D) and, optionally, C) and a polytetrafluoroethylene powder E) or a silicone resin F), they do show high flame resistance, but moldings produced from them sometimes have surface defects, for example in the form of microcracks or streaks.

This can be safely avoided by using very finely divided and, in addition, unsintered tetrafluoroethylene polymers in the form of a coagulated mixture of emulsions of the tetrafluoroethylene polymers E) with emulsions of the graft polymers C) and/or emulsions or dispersions of the graft polymers C), with emulsions of the silicone resins F).

To prepare a corresponding mixture containing tetrafluoroethylene polymer, an aqueous emulsion (latex) of a graft polymer C) having average latex particle sizes of from 0.05 to 30.0 μm, preferably from 0.02 to 5.0 μm and, more preferably, from 0.2 to 0.6 μm is initially prepared and then mixed with a finely divided emulsion of a tetrafluoroethylene polymer E) in water having average particle sizes of from 0.05 to 20 μm and preferably from 0.08 to 10 μm; suitable tetrafluoroethylene polymer emulsions typically have solids contents of 30 to 70% by weight and, more particularly, from 50 to 60% by weight. The emulsions of the graft polymers C) to be used have solids contents of from 20 to 60% by weight and, more particularly, from 30 to 45% by weight.

The ratio by weight of graft polymer C) to tetrafluoroethylene polymer E) in the emulsion mixture is from 95:5 to 60:40. The emulsion mixture is then coagulated in known manner, for example by spray drying, freeze drying or coagulation by addition of inorganic or organic salts, acids, bases or organic water-miscible solvents, such as alcohols, ketones, preferably at temperatures in the range from 20° to 150° C. and more preferably at temperatures in the range from 50° to 100° C. If necessary, drying may be carried out at 50° to 200° C. and preferably at 70° to 100° C.

Suitable tetrafluoroethylene polymer emulsions are commercially available products and are marketed, for example, by DuPont as Teflon ® 30N.

The powder-form polymer mixtures of silicone resin F) and graft polymer C) (according to DE-OS 38 15 124 (Le A 25 925)) are produced by:

I. mixing a dispersion of an organic, thermoplastic polymer C) having an average particle diameter ($d_{50}$) of from 0.05 to 30.0 μm, preferably from 0.05 to 5.0 μm and, more preferably, from 0.2 to 0.6 μm and a solids content of 20% by weight to 60% by weight, based on the weight of the dispersion of component C), with an emulsion of a silicone resin F) corresponding to formula (VII) with an average particle diameter ($d_{50}$) of from 0.05 to 3 μm and preferably from 0.1 to 1 μm and a solids content of up to 60% by weight and preferably in the range from 30 to 50% by weight, based on the weight of the emulsion of component F), so thoroughly and in such quantitative ratios that hardly any agglomeration of the particles occurs and mixtures of 0.1% by weight to 50% by weight, preferably 5% by weight to 40% by weight and, more preferably, 8% by weight to 20% by weight silicone resin F) with 99.9% by weight to 50% by weight, preferably 95% by weight to 60% by weight and, more preferably, 92% by weight to 80% by weight thermoplastic polymer C), based on the total sum of silicone resin F) and thermoplastic polymer C);

II. coagulating the resulting mixture in known manner at 20° C. to 120° C. and at pH values of 7 to 2 and preferably in the range from 5 to 3 to form a finely divided mixture of components C) and F); and III. drying the coagulate in known manner after isolation at temperatures in the range from 50° C. to 150° C. and preferably at temperatures in the range from 80° C. to 120° C.

Since the graft polymers C) to be used in accordance with the invention are used by preliminary mixing of emulsions thereof with emulsions of component E), it is best to produce component C) by the process of emulsion polymerization. The ratio in which the polytetrafluoroethylene E) and the graft polymer C) are used should be selected so that the total content of E) in the mixture of A), B) and C) is from 0.05 to 5.0 parts by weight and preferably from 0.1 to 1.0 part by weight. The corresponding ratio of silicone resin F) to graft polymer C) should be selected so that the total content of silicone resin F) in the mixture of A), B) and C) is from 0.05 to 10.0 parts by weight and preferably from 0.2 to 3.0 parts by weight.

The thermoplastic molding compounds according to the invention may contain other thermoplastics, such as polyalkylene carboxylic acid esters, polysulfones, polyether sulfones, polyketones, polyether ketones, polyphenylene ethers, polyarylene sulfides and also other additives, such as stabilizers, pigments, flow aids, mold release agents, antistatic agents and/or other flameproofing additives, such as metal- or halogen compounds.

Accordingly, the present invention also relates to polycarbonate molding compounds containing components A), B), D) and, optionall, components C) and/or E) and/or F) and/or optionally thermoplastic polyalkylene carboxylic acid esters, thermoplastic polysulfones, thermoplastic polyether sulfones, thermoplastic polyketones, thermoplastic polyether ketones, thermoplastic polyphenylene ethers, thermoplastic polyarylene sulfides, stabilizers, pigments, flow aids, mold release agents, antistatic agents and/or other flameproofing agents.

The thermoplastic molding compounds according to the invention containing components A), B), D) and, optionally, components C) and/or E) and/or F) and/or optionally thermoplastic polyalkylene carboxylic acid esters, thermoplastic polysulfones, thermoplastic polyether sulfones, thermoplastic polyketones, thermoplastic polyether ketones, thermoplastic polyphenylene ethers, thermoplastic polyarylene sulfides, stabilizers, pigments, flow aids, mold release agents, antistatic agents and/or other flameproofing agents are produced by mixing the respective constituents in known manner and melt-compounding or melt-extruding the resulting mixture in standard units, such as internal kneaders, extruders or twin-screw extruders, at temperatures in the range from 200° to 330° C. or by mixing solutions of the respective constituents mentioned above in suitable organic solvents, for example in chlorobenzene, and concentrating the resulting mixtures by evaporation in standard units, for example in evaporation extruders.

The individual constituents may be mixed in known manner both successively and simultaneously both at around 20° C. (room temperature) and at higher temperatures.

Accordingly, the present invention also relates to a process for the production of thermoplastic polycarbonate molding compounds containing components A), B), D) and, optionally, components C) and/or E) and/or F) and/or optionally thermoplastic polyalkylene carboxylic acid esters, thermoplastic polysulfones, thermoplastic polyether sulfones, thermoplastic polyketones, thermoplastic polyether ketones, thermoplastic polyphenylene ethers, thermoplastic polyarylene sulfides, stabilizers, pigments, flow aids, mold release agents, antistatic agents and/or other flameproofing agents, characterized in that the respective constituents mentioned above are mixed in known manner and the resulting mixture is melt-compounded or melt-extruded in standard units at temperatures in the range from 200° C. to 330° C. or in that solutions of the respective constituents mentioned above in suitable organic solvents are mixed and the resulting mixtures are concentrated by evaporation in standard units.

The molding compounds according to the invention may be used for the production of moldings of any kind. More particularly, molding can be produced by injection molding. Examples of molding which can be produced from the molding compounds according to the invention are housing parts of any kind (for example for domestic appliances, such as juice presses, coffee machines, mixers) or cover panels for the building industry and parts for the automotive industry. In addition, they are used in the field of electrical engineering because they show very good electrical properties.

Another form of processing is the production of moldings by deep drawing or by thermoforming of pre-extruded sheets or films.

In the context of the invention, particle size always means the average particle diameter $d_{50}$, as determined by ultracentrifuge measurements in accordance with W. Scholtan et al., Kolloid-Z. u. Z. Polymere 250 (1972) pages 782 to 796.

EXAMPLE 1

Preparation of phosphoric acid 2,4-di-(1-phenylethyl)-phenyl-bis-phenyl ester

To prepare 2,4-di-(1-phenylethyl)-phenol, 1129.4 g phenol (12 mol) and 11.3 g concentrated sulfuric acid (after melting of the phenol) are introduced into and heated to 100° C. in a 6 liter flask equipped with a stirrer, thermometer, dropping funnel, reflux condenser and nitrogen inlet pipe and heated by a mushroom heating hood with temperature control. 2749.6 g styrene (24 mol with a 10% excess) are added dropwise over a period of 8 hours, the temperature rising to 125° C. The reaction mixture is left to react for 1 hour at that temperature and then for 5 hours at 150° C. After cooling to approximately 80° C., 4.8 g magnesium oxide are added and reacted in 1 hour to neutralize the sulfuric acid.

The main product is separated from first runnings and residue by vacuum distillation in a Vigreux column.

The first runnings are removed under a pressure of 3 mbar and at a sump temperature rising to 200° C. and at a maximum boiling temperature of 150° C. The yield comprises 312.1 g. The product is predominantly 1-phenylethyl phenol (OH value 270; $n^{20}_D$ 1.5936).

Distillation of the 2,4-di-(1-phenylethyl)-phenol is carried out under a pressure of 3 mbar and at a sump temperature of 210° to 250° C. The boiling temperature is in the range from 170° to 240° C. 3169.2 g product are obtained (OH value 174, theoretical 185; $n^{20}_D$ 1.6039). The yield comprises 87.3%, based on the phenol used.

In addition to the inorganic constituents, the distillation residue (218.5 g) contains 2,4,6-tri-(1-phenylethyl)-phenol. The residue was discarded.

To prepare phosphoric acid-2,4-di-(1-phenylethyl)-phenyl-bis-phenyl ester, 1934.8 g 2,4-di-(1-phenylethyl)-phenol (6 mol, OH value 174), 1957.8 g triphenyl phosphate (6 mol) and 10.1 g sodium phenolate (0.09 mol) are heated to 150° C. in a 6 liter flask provided with a capillary, a Vigreux column with a descending condenser and a thermometer and heated by a mushroom heating hood with temperature controller. The pressure is then slowly reduced to 300 mbar and the mixture heated to 200° C. A stream of nitrogen flowing in through the capillary mixes the contents of the flask. After approximately 1 hour, the pressure is further reduced to 4 mbar at 200° C., most of the phenol eliminated being distilled off over a period of about 4 hours. The reaction mixture is then heated for another 3 hours at a temperature rising to approximately 250° C. and under a pressure falling to 5 mbar.

554.4 g crystallized product having an OH value of 589 are obtained as the distillate. It contains 547.7 g phenol (6 mol phenol: 567.7 g).

The residue is taken up in methylene chloride in the flask and washed repeatedly with water. The methylene chloride solution is then dried and concentrated. The resin-like residue comprises 3089.9 g which corresponds to a yield of 96.3%. The OH value is 0 and the phosphorus content 5.5% (theoretical 5.8%). The product is predominantly present as phosphoric acid 2,4-di-(2-phenylethyl)-phenyl-bis-phenyl ester.

Instead of 2,4-di-(1-phenylethyl)-phenol, it is also possible for example to use 2,4-dibenzyl phenyl and 2,4-di-(1-methyl-1-phenylethyl)-phenol.

Dynamic TGA measurements (heating rate 10° C./minute) showed that the total volatile component of the above phosphate according to the invention at 290° C. comprises approx. 6% by weight compared with triphenyl phosphate with a weight loss of 100%.

EXAMPLE 2

Preparation of a mixture of phosphoric acid 2,4-di-(1-phenylethyl)-phenyl-bis-phenyl ester and phosphoric acid phenyl-bis-[(1-phenylethyl)-phenyl]-ester To prepare 2,4-di-(1-phenylethyl)-phenol and (1-phenylethyl)-phenol, 2823.4 g phenol (30 mol) and 100.0 g acidic ion exchanger (Lewatit SPC 108, a product of Bayer AG, swollen in the reaction mixture of a batch prepared beforehand) are introduced into and heated to 55° C. in a 6 liter flask equipped with a stirrer, thermometer, dropping funnel, reflux condenser and nitrogen inlet pipe and heated by a mushroom heating hood with temperature control. 2083.0 g styrene (20 mol) are added dropwise over a period of 5 hours, the temperature rising to 85° C. The reaction mixture is then left to react for 1 hour at that temperature and then for 2.5 hours at 70° C. The ion exchanger is then filtered off.

The excess phenol is removed by vacuum distillation in a Vigreux column. Under a pressure of 3 mbar and at a sump temperature rising to 200° C., 1273.0 g phenol (13.5 mol) distill over at a maximum boiling temperature of 160° C. The residue (3552.4 g, OH value 255) is the product intended for conversion into the phosphoric acid ester. Vacuum distillation in accordance with Example 1 shows that it consists of 2723.5 g (1-phenylethyl)-phenol (13.7 mol, OH value 280, theoretical 283), 772.7 g 2,4-di-(1-phenylethyl)-phenol (2.6 mol, OH value 184, theoretical 186) and 47.6 g 2,4,6-tri-(1-phenylethyl)-phenol (0.1 mol, OH value 146, theoretical 138).

To prepare the phosphoric acid ester from the above phenol mixture, 2589.7 g phenol mixture (1988.0 g (10.0 mol) (1-phenylethyl)-, 573.9 g (1.9 mol) 2,4-di-(1-phenylethyl)- and 29.7 g (0.07 mol) 2,4,6-tri-(1-phenylethyl)-phenol), 2284.1 g triphenyl phosphate (7 mol) and 20.0 g magnesium chloride (0.2 mol) are heated to 150° C. in a 6 liter flask equipped with a capillary, Vigreux column with distillation bridge and a thermometer and heated by a mushroom heating hood with temperature control. The pressure is then slowly reduced to 300 mbar and the reaction mixture heated to 200° C. A stream of nitrogen flowing in through the capillary mixes the contents of the flask. After about 1 hour, the pressure is further reduced to 4 mbar at 200° C. and most of the phenol eliminated is distilled off over a period of about 6 hours. The reaction mixture is then heated for another 2 hours at a temperature rising to approximately 250° C. and under a pressure falling to 3 mbar.

1112.8 g crystallized product having an OH value of 582 are obtained as the distillate. It contains 1086.3 g phenol (12.0 mol phenol: 1129.4 g).

The residue in the flask is taken up in methylene chloride and washed repeatedly with water. The methylene chloride solution is then dried and concentrated. The resin-like residue comprises 3649.4 g, which corresponds to a yield of 97.0%. The OH value is 0 and the phosphorus content 5.4% (theoretical 5.8%). The product is present as the above mixture. In addition, it contains small quantities of phosphoric acid 2,4,6-tri-(1-phenylethyl)-phenylbis-phenyl ester and triphenyl phosphate, the latter in a quantity of 2.2% by weight.

Dynamic TGA measurements (heating rate 10° C./minute) showed that the total volatile component of the above phosphate according to the invention at 290° C. comprises approximately 6% by weight compared with triphenyl phosphate with a weight loss of 100%.

EXAMPLE 3

Materials used:
I. Aromatic polycarbonate of 10% by weight tetrabromobisphenol A and 90% by weight bisphenol A, relative viscosity 1.284, as measured in methylene chloride at 25° C. (0.5% by weight solution).
II. Aromatic polycarbonate of 100% by weight bisphenol A, relative viscosity 1.284, as measured in methylene chloride at 25° C. (0.5% by weight solution).
III. Aromatic oligomeric carbonate of 100% by weight tetrabromobisphenol A, Great Lakes BC-52-HP, a product of Great Lakes Chem. Corp., USA.
IV. Thermoplastic polymer of styrene and acrylonitrile having an acrylonitrile content of 29% by weight and an average molecular weight of 60,000.
V. ABS graft polymer of 50% by weight styrene/acrylonitrile mixture (ratio 72:28) on 50% by weight particulate polybutadiene having an average particle diameter ($d_{50}$) of 0.4 μm obtained by emulsion polymerization.
VI. Polymer V containing 10% by weight prepared by mixing the ABS graft polymer in the form of a latex and the polytetrafluoroethylene in the form of a dispersion, coagulating the mixture and working up the coagulate as a co-precipitate.
VII. Polymer V containing 10% silicone resin prepared by mixing the graft polymer in the form of a latex and the silicone resin in the form of an emulsion, coagulating the mixture and working up the coagulate as a co-precipitate.
VIII. Phosphoric acid 2,4-di-(1-phenylethyl)-phenyl-bis-phenyl ester of Example 1.
IX. Phosphoric acid phenyl-bis-((1-phenylethyl)-phenyl)-ester according to Example 1 of German patent application P 38 24 356.3 (Le A 26 015).
X. Mixed phosphoric acid ester of Example 2.
XI. Pentaerythritol tetrastearate.

Production and Testing of the Molding Compounds

The constituents are mixed in the quantities (parts by weight) shown in Table 1 in a Banbury internal kneader (Pomini Farrel) of the BR type (1.2 l) or OOC type (3 l) at a temperature of 230° to 240° C. and worked up to granulate.

TABLE 1

| Component | Components used (in % by weight) | | | | | | | | | | |
| --- | --- | --- | --- | --- | --- | --- | --- | --- | --- | --- | --- |
| | I | II | III | IV | V | VI | VII | VIII | IX | X | XI |
| Example 3.1 | 65.0 | | | 9.7 | 10.0 | 2.3 | | 12.5 | | | 0.5 |
| Example 3.2 | 65.0 | | | 12.5 | 8.0 | 4.0 | | | | 10.0 | 0.5 |
| Example 3.3 | 65.0 | | | 10.5 | 2.0 | | 10.0 | | | 12.0 | 0.5 |
| Example 3.4 | | 60.0 | 6.0 | 11.5 | 6.0 | 4.0 | | | | 12.0 | 0.5 |
| Example 3.5 | | 65.0 | 8.0 | 6.5 | | | 10.0 | | | 10.0 | 0.5 |
| Example 3.6 | 65.0 | | | 10.5 | 4.0 | 4.0 | | 6.0 | 10.0 | | 0.5 |
| Example 3.7 | 65.0 | | | 10.5 | 4.0 | 4.0 | | | | 16.0 | 0.5 |

The molding compounds are injection-molded to test specimens at 260° C. (unit: Werner und Pfleiderer DKS 275 screw, locking force 275 MP, screw diameter 56 mm, length L/D-23/1) and subjected to the following tests:
impact strength according to DIN 43 543 ($a_n$)
notched impact strength according to DIN 53 543 ($a_k$)
heat resistance according to DIN 53 460 (Vicat B)
Underwriters' Laboratories fire test (UL 94)

Table 2 shows the test results obtained:

TABLE 2

| | Test results | | | |
|---|---|---|---|---|
| | $a_n$ kJ/m$^2$ | $a_k$ kJ/m$^2$ | Vicat B °C. | UL 94 1.6 mm-bar |
| Example 3.1 | u.b.* | 6 | 98 | V-O |
| Example 3.2 | u.b. | 12 | 102 | V-O |
| Example 3.3 | u.b. | 15 | 99 | V-O |
| Example 3.4 | u.b. | 7 | 99 | V-O |
| Example 3.5 | u.b. | 12 | 105 | V-O |
| Example 3.6 | u.b. | 5 | 89 | V-O |
| Example 3.7 | u.b. | 5 | 87 | V-O |

*u.b. unbroken

Tables 1 and 2 of Example 3 show that phosphate according to the invention both individually and in admixture with another not-volatility phosphate, more particularly in admixture with phosphoric acid phenyl-bis-((1-phenylethyl)-phenyl)-ester, give blends of polycarbonate and ABS components in the presence of typical quantities of polytetrafluoroethylene or silicone resin a level of flame resistance which corresponds to a UL 94 classification of V-0 for 1.6 mm thick test specimens.

We claim:

1. A thermoplastic polycarbonate molding composition consisting of
   A) 40 to 90 parts by weight of a thermoplastic aromatic polycarbonate,
   B) 10 to 50 parts by weight of a thermoplastic copolymer of 50 to 95% by weight of at least one member selected from the group consisting of styrene, α-methyl styrene, ring-alkylated styrene and halostyrene and 5 to 50% by weight of at least one member selected from the group consisting of acrylonitrile, methacrylonitrile, alkyl acrylate, alkyl methacrylate, maleic anhydride, N-substituted maleic imide and vinyl acetate,
   D) 1 to 25 parts by weight, based on 100 parts by weight of the total weight of A) and B) of a phosphorus compound, and
   F) 0.05 to 10 parts by weight, based on 100 parts by weight of the total weight of A) and B), of a silicone resin having the empirical formula (VII),

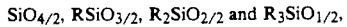

in which
R is a monofunctional hydrocarbon radical, which may optionally be substituted itself,
R' is an alkyl group or a hydrogen atom,
x has a value of 0.75 to 1.75 and
y has a value of 0.0001 to 0.5, and in which the silicone resin is built up of units corresponding to the formula $SiO_{4/2}$, $RSiO_{3/2}$, $R_2SiO_{2/2}$ and $R_3SiO_{1/2}$, characterized in that said D) corresponds to formula (I)

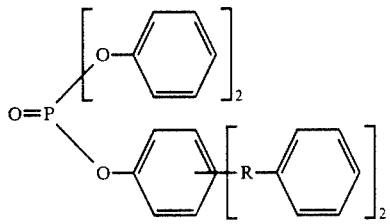

in which
R is a —CH$_2$—,

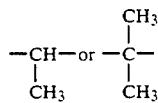

group and the aromatic radicals may even be alkyl-substituted.

* * * * *